USA005842549A

United States Patent [19]
Hall, III

[11] Patent Number: 5,842,549
[45] Date of Patent: Dec. 1, 1998

[54] PISTON STROKE CONTROLLER IN A TORQUE TRANSMITTING ASSEMBLY

[75] Inventor: Arthur Hall, III, Cicero, Ind.

[73] Assignee: General Motors Corporation, Detroit, Mich.

[21] Appl. No.: 872,910

[22] Filed: Jun. 11, 1997

[51] Int. Cl.$^6$ ........................ F16D 25/0638; F16D 65/58
[52] U.S. Cl. .................................. 192/70.25; 192/111 A; 188/71.8; 188/196 V; 92/13.7
[58] Field of Search ............................. 192/111 A, 70.25; 188/71.7, 71.8, 196 V, 196 R; 92/13, 13.7

[56] References Cited

U.S. PATENT DOCUMENTS

| | | | |
|---|---|---|---|
| 3,820,635 | 6/1974 | Hurt | 192/111 A X |
| 4,355,708 | 10/1982 | Papagni | 188/71.9 X |
| 4,378,863 | 4/1983 | Baum | 188/71.8 |
| 4,454,933 | 6/1984 | Hunnicutt et al. | 192/111 A X |
| 4,792,021 | 12/1988 | Fukazawa et al. | 192/111 A |
| 4,798,100 | 1/1989 | Baumgarten | 192/111 A X |
| 5,749,451 | 5/1998 | Grochowski | 188/71.8 X |

Primary Examiner—Rodney H. Bonck
Assistant Examiner—Ankur Parekh
Attorney, Agent, or Firm—Donald F. Scherer

[57] ABSTRACT

Power transmission torque transmitting assemblies, such as clutches and brakes, have an axially movable piston which is hydraulically actuated to engage and enforce frictional contact between a plurality of friction discs. Upon piston retraction during disengagement, a stroke adjustment mechanism establishes the retraction distance of the piston and thereby the free-running clearance in the torque transmitter. The stroke adjustment mechanism has a helical gear movable axially with the piston during engagement and disengagement. During engagement, the piston is free to rotate as required by a retainer plate to accommodate fall engagement with the torque transmitting assembly. During disengagement, a one-way assembly prevents rotation of the gear relative to a spring retainer plate and limits axial movement of the piston relative to the retainer plate to establish the disengaged position of the piston and the proper free-running clearance in the torque transmitting assembly.

4 Claims, 2 Drawing Sheets

5,842,549

PISTON STROKE CONTROLLER IN A TORQUE TRANSMITTING ASSEMBLY

TECHNICAL FIELD

This invention relates to stoke control limiters for axially displaceable pistons in power transmissions.

BACKGROUND OF THE INVENTION

Power transmissions have a plurality of fluid actuated torque transmitting mechanisms, such as clutches and brakes. These mechanisms have sets of friction members alternately splined to outer components, such as rotary hubs for clutches and a stationary housing for brakes, and inner components, such as hubs connected with gear members or an input drive member.

A fluid operated piston is provided to enforce frictional contact between the adjacent members to permit torque transmission between the inner and outer components. When the torque transmitter is disengaged, a free-running clearance is present to reduce the spin losses and heat generation within the torque transmitting mechanism.

At least one of the friction member sets has a friction material bonded thereto. This material is subject to wear over the life of the transmission. While the reduced material thickness does not affect the torque transmitting ability, it can affect engagement time since the piston will need additional axial travel to take up the free-running clearance and complete the engagement of the torque transmitting mechanism.

With the advent of electronic shift controls, it is desirable to have consistent piston travel so that the shift timing is more predictable and the volume of fluid required to move the piston to complete engagement is substantially constant.

SUMMARY OF THE INVENTION

It is an object of this invention to provide an improved torque transmitting structure having a piston travel adjuster.

In one aspect of the invention, a gear member disposed between an axially movable piston and a spring retainer plate allows unimpeded relative travel of the piston in one axial direction but permits restricted relative travel in the opposite axial direction.

In another aspect of this invention, a stroke adjuster for a torque transmitter has a helical gear rotatably mounted on a piston and meshing with a reaction gear surface on a spring retainer plate. The gear rotates relative to the reaction plate and piston during engagement of the torque transmitter to close the free-running clearance in the torque transmitter but is limited to axial motion on disengagement as controlled by the take-up clearance and a one-way torque transmitter.

In yet another aspect of this invention, the take-up clearance is provided between the helical gear teeth and the reaction gear surface.

In still another aspect of this invention, the take-up clearance allows limited axial movement of the piston relative to the retainer plate during disengagement of the torque transmitter.

DESCRIPTION OF AN EXEMPLARY EMBODIMENT

Figure 1:
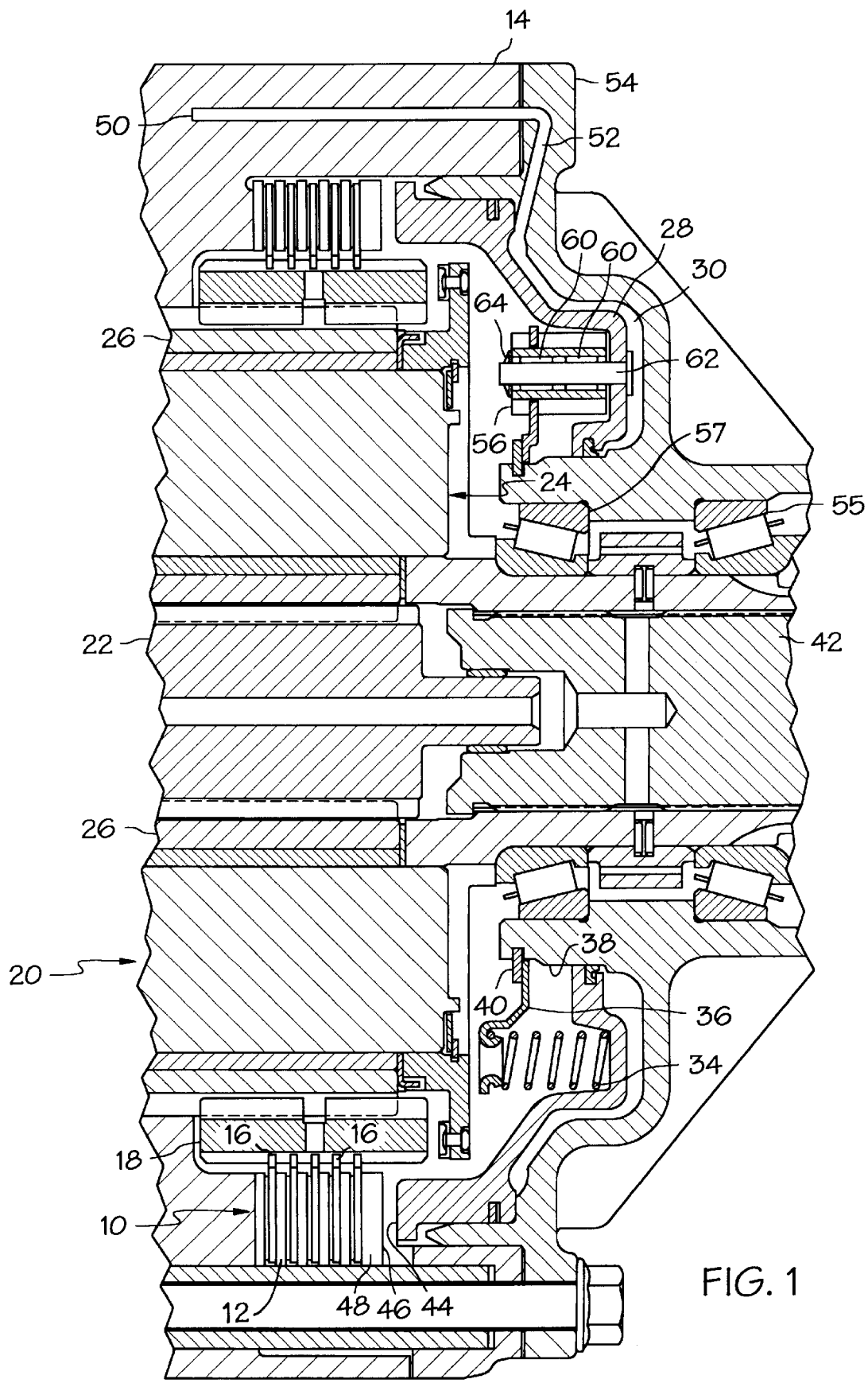
FIG. 1 is a cross-sectional side elevational view of a torque transmitting device in a power transmission.
Figure 2:
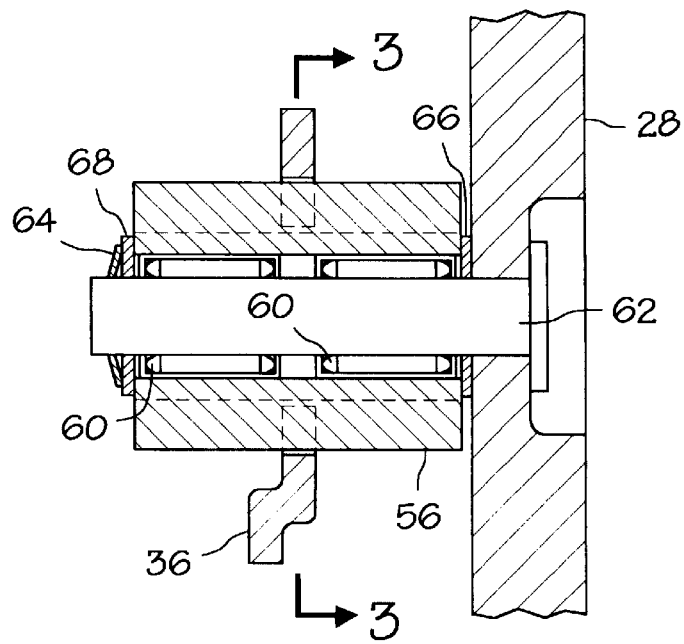
FIG. 2 is a view of an enlarged portion of FIG. 1.
Figure 3:
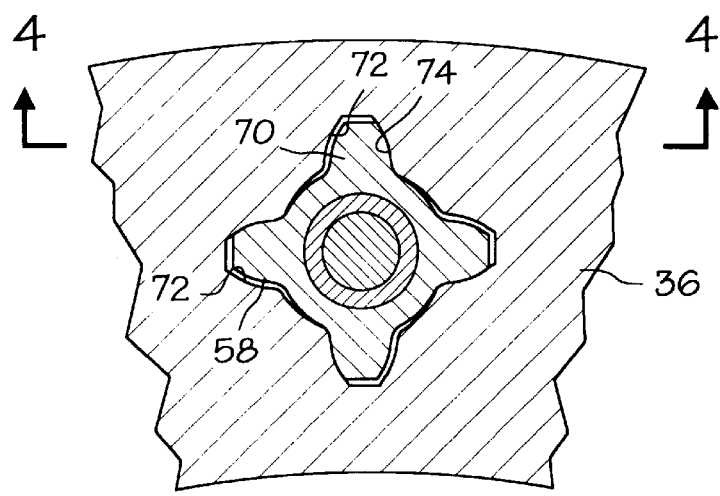
FIG. 3 is a view taken along line 3—3 of FIG. 2.

Referring to the drawings, wherein like characters represent the same or corresponding parts throughout the several views, there is seen in FIG. 1 a selectively engageable friction torque transmitter 10 which is comprised of a plurality of friction plates 12 splined at the outer diameter thereof to a housing 14 and a plurality of friction plates 16 splined at the inner diameter thereof to a gear member 18.

The gear member 18 is a ring gear disposed within a planetary gear assembly 20 which also includes an input member sun gear 22, a planet carrier assembly 24 which includes a plurality of rotatably mounted planetary gears 26 meshing with the gear 18 and the sun gear 22.

The friction torque transmitter 10 also includes a piston 28 which is slidably disposed in a chamber 30 formed in the housing 14. The piston 28 is axially movable by applying fluid pressure to the chamber 30. The piston is retracted to the position shown by a plurality of return springs 34 which are secured with a retainer plate 36. The springs 34 are compressed between the retainer plate 36 and the piston 28. The retainer plate is positioned on a hub 38 formed in the housing 14 by a lock ring 40. The retainer plate is restricted in movement in the housing 14 so as to apply a continuous separating force to the piston 28.

The sun gear 22 is drivingly connected with a shaft, not shown, while the carrier assembly 24 is drivingly connected with a transmission output shaft member 42. The ring gear 18 is held stationary by the friction torque transmitter 10, such that a reduction drive between the sun gear 22 and the shaft 42 is provided whenever the torque transmitter 10 is engaged. When the torque transmitter 10 is disengaged, the plates 12 and 16 are free to rotate relative to one another with minimum or no frictional load therebetween. The amount of free-running clearance is depicted at the face 44 of the piston 28 and the face 46 of an apply plate 48.

When fluid pressure is admitted to the chamber 30, the piston 28 will move leftward, as seen in FIG. 1, until the faces 44 and 46 come into contact, at which time the plates 16 and 12 will be compressed together to provide a frictional torque transmitting connection between the gear 18 and the housing 14.

The housing 14 is shown as a stationary component within the transmission and therefore the torque transmitter 10 is a brake assembly. The substantially identical structure can be utilized in a clutch assembly wherein the housing 14 would be a rotating component as would the input and output members 22 and 42. The similarities of clutches and brakes is well known to those skilled in the art, such that it is not believed necessary to depict a rotating clutch assembly as well as a brake assembly.

The chamber 30 is supplied with fluid for actuation of the clutch through a passage 50 formed in the housing 14 and a passage 52 which is formed in an end cover 54 which is secured to become a component of the housing 14. The piston 28 is in fact slidably disposed in the end cover 54 to provide for easier assembly of the torque transmitting device.

The planet carrier 24 is rotatably supported in a pair of tapered roller bearings 55 and 57 which are disposed between the carrier and the end cover 54. The piston 28 has disposed thereon a plurality of stroke control elements including a helical gear 56, a gear reaction surface or profile 58 formed in the retainer plate 36 and a pair of one-way devices 60. The gear 56 and profile 58 are disposed in meshing rotation such that, on relative axial movement therebetween, the gear 56 is urged to rotate on the pin 62. The one-way devices 60 are identical and are provided to permit free rotation of the helical gear on a support pin or post 62 during one direction of axial movement, the engaging direction, and to prevent relative rotation on the pin 62 during the opposite axial movement, the disengagement direction.

The pin 62 is secured in the piston 28. The helical gear 56 is positioned on the pin 62 by a spring washer 64. A pair of thrust washers 66 and 68 are disposed on the pin 62 between the gear and piston and between the gear and spring washer, respectively. These trust washers will accommodate relative rotary motion which will occur during torque transmitter engagement when additional linear or axial movement of the piston is required to complete engagement.

Figure 4:
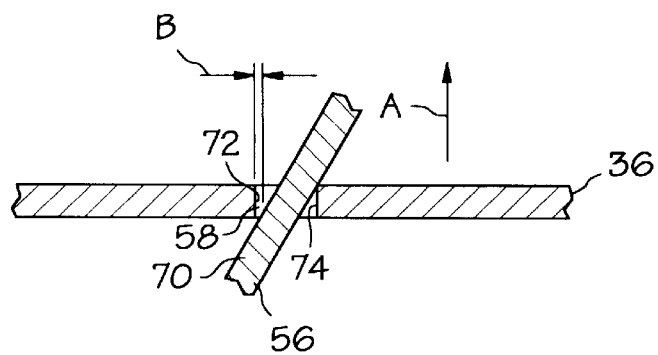
FIG. 4 is a view taken along line 4—4 of FIG. 3.

In FIG. 4, there is seen the helix of the gear 56 relative to the gear profile 58. It should be noted that when the gear 56 moves in the direction of the arrow A, the engaging direction, a space B is taken up between a tooth 70 of the gear 56 and a sidewall 72 of the reaction profile 58. This movement B is the movement necessary to take up the free-running clearance of the torque transmitter 10 which is depicted between the faces 44 and 46 of FIG. 1.

In actual operation, this space will appear much smaller since the individual friction plates 12 and 16 will separate from each other when the device is disengaged and essentially evenly to spread the amount of free-running clearance between the various friction faces.

During the engagement of the torque transmitter 10, the free-running clearance B must be taken up and at that point, if the friction device is not fully engaged, the piston 28 will continue to move axially leftward until total engagement or complete engagement of the torque transmitter 10 is accomplished.

In order for the piston 28 to undergo this additional movement, the gear 56 must move axially relative to the retainer plate 36. To accomplish this movement, the reaction profile 58 requires the gear 56 to rotate on the pin 62. This rotation is freely permitted by the one-way devices 60. When the friction torque transmitter 10 is fully engaged, the clearance space B will be moved from between the surface 72 and the gear tooth 70 to a surface 74 and the gear tooth 70. In other words, the clearance space B will be on the opposite side of the tooth 70 during the engagement of the torque transmitter 10.

The space B may be either proportional to or equal to the free-running clearance desired within the torque transmitter during disengagement. As the torque transmitter 10 is disengaged, the pressure in chamber 30 is relieved such that the return springs 34 will enforce separation between the piston 28 and the plate 48. The rightward movement of the piston will continue until, as seen in FIG. 4, the surface of the tooth 70 contacts the surface 74 of the reaction profile 58.

At this point, the force in the return springs 34 will attempt to enforce rotation between the helical gear 56 and the retainer plate 36. However, due to the one-way devices 60, the gear 56 is unable to rotate in the required direction, therefore the piston 28 will-be halted in its disengagement travel to establish the position of the piston 28 for the free-running clearance B.

Should the friction plates 12 or 16 during the transmission life undergo some amount of wear, the amount of travel for the piston 28 during the engagement process will increase. The stroke control mechanism, as described above, will permit the additional travel without changing the free-running clearance of the device during disengagement.

The above description has been directed to a single piston stroke control mechanism. In reality, it will be desirable to use two or more such devices spread equiangularly above the piston 28. The number of devices utilized will depend upon the separation which are presented by the return springs 34. The devices are equiangularly distributed to balance the forces between the retainer plate and the piston stroke control devices.

The exemplary embodiment described above for FIGS. 1 through 4 depicts the free-running clearance B as occurring between the gear tooth 56 and the reaction profile 58. However, the clearance can be incorporated between the gear 56 and the piston 58, if desired, such that the reaction profile and the teeth of gear 56 would be in a close mesh fit and the piston 28 would be moved axially relative to the member 58 rather than having the gear member 56 move axial relative to the profile 58.

Obviously, many modifications and variations of the present invention are possible in light of the above teaching. It is therefore to be understood, that within the scope of the appended claims, the invention may be practiced otherwise than as specifically described.

What is claimed is:

1. A piston stroke adjuster in a torque transmitter comprising:

a piston slidably disposed in a housing for axial movement in an engaging direction and in a disengaging direction;

a return spring retainer assembly having a retainer plate, a plurality of springs mounted in compression between said retainer plate and said piston, means for positioning said retainer plate in said housing, and a reaction gear profile having a plurality of teeth formed in said retainer plate;

a helical gear rotatably mounted on one-way torque transmitting means on a post secured to said piston, said gear extending through and engaging said gear profile, said helical gear having a plurality of teeth;

means for positioning said gear on said post; and a clearance space is formed adjacent said gear to permit limited axial movement of said piston relative to said retainer plate during axial movement of said piston in both said engaging and disengaging directions, said one-way torque transmitting means permitting rotation of said helical gear relative to said retainer plate during engaging motion of said piston after said clearance space is closed and preventing rotation of said helical gear relative to said retainer plate during disengaging movement of said piston after said clearance space has opened.

2. The piston stroke adjuster defined in claim 1 wherein said clearance space is formed between said helical gear and said reaction gear profile whereby said helical gear moves axially simultaneously with said piston relative to said reaction plate until said clearance space is closed.

3. The piston stroke adjuster defined in claim 1 wherein each tooth of said teeth of said reaction gear profile has a tooth thickness greater than the tooth thickness of each tooth of the teeth on said helical gear to provide said clearance space.

4. A piston stroke adjuster in a torque transmitting assembly comprising:

a plurality of first torque transmitting plates drivingly connected with a housing;

a plurality of second torque transmitting plates interspersed with said first torque transmitting plates drivingly connected with a hub;

a piston slidably disposed in said housing for axial movement in an engaging direction to enforce frictional engagement between said first and second torque transmitting plates and in a disengaging direction to permit a free-running clearance to be established between said first and second torque transmitting plates to provide a selective torque transmitting relation between said housing and said hub;

a return spring retainer assembly having a retainer plate, a plurality of springs mounted in compression between said retainer plate and said piston, means for positioning said retainer plate in said housing, and a reaction gear profile having and plurality of teeth formed in said retainer plate;

a helical gear rotatably mounted on one-way torque transmitting means on a post secured to said piston, said gear extending through and engaging said gear profile, said helical gear having a plurality of teeth;

means for positioning said gear on said post; and a clearance space substantially equal to said free-running clearance adjacent said gear to permit limited axial movement of said piston relative to said retainer plate during axial movement of said piston in both said engaging and disengaging directions, said one-way torque transmitting means permitting rotation of said helical gear relative to said retainer plate during engaging motion of said piston after said clearance space is closed and preventing rotation of said helical gear relative to said retainer plate during disengaging movement of said piston after said clearance space has opened.

\* \* \* \* \*